United States Patent
Yamanaka et al.

(10) Patent No.: US 11,621,430 B2
(45) Date of Patent: Apr. 4, 2023

(54) FUEL CELL SYSTEM

(71) Applicant: TOYOTA JIDOSHA KABUSHIKI KAISHA, Toyota (JP)

(72) Inventors: Tomio Yamanaka, Nagoya (JP); Tomotaka Ishikawa, Nagoya (JP); Shinji Asou, Toyota (JP); Tsuyoshi Maruo, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 235 days.

(21) Appl. No.: 16/520,608

(22) Filed: Jul. 24, 2019

(65) Prior Publication Data

US 2020/0044269 A1 Feb. 6, 2020

(30) Foreign Application Priority Data

Jul. 31, 2018 (JP) .............................. JP2018-143307

(51) Int. Cl.
| | |
|---|---|
| *H01M 8/02* | (2016.01) |
| *H01M 8/04225* | (2016.01) |
| *H01M 8/04223* | (2016.01) |
| *H01M 8/04302* | (2016.01) |
| *H01M 8/04701* | (2016.01) |

(52) U.S. Cl.
CPC ... *H01M 8/04225* (2016.02); *H01M 8/04253* (2013.01); *H01M 8/04268* (2013.01); *H01M 8/04302* (2016.02); *H01M 8/04731* (2013.01)

(58) Field of Classification Search
CPC ............................................. H01M 8/04225
See application file for complete search history.

(56) References Cited

U.S. PATENT DOCUMENTS

| | | | |
|---|---|---|---|
| 2004/0106026 A1* | 6/2004 | Fujita ................ | H01M 8/04302 429/423 |
| 2005/0147863 A1* | 7/2005 | Hiramatsu ........ | H01M 8/04097 429/413 |
| 2009/0076661 A1* | 3/2009 | Pearson ................... | H02J 7/34 700/291 |

(Continued)

FOREIGN PATENT DOCUMENTS

| | | |
|---|---|---|
| DE | 102020214689 A1 * | 5/2022 |
| JP | 2011-003465 | 1/2011 |

(Continued)

*Primary Examiner* — Amanda C. Walke
(74) *Attorney, Agent, or Firm* — Finnegan, Henderson, Farabow, Garrett & Dunner, LLP

(57) ABSTRACT

A fuel cell system includes a controller that controls actions of the fuel cell system. The controller includes a freezing presence-absence determination unit that performs freezing presence-absence determination, a temperature raising execution unit that performs temperature raising processing for raising a temperature of an exhaust and drain valve, and a thawing presence-absence determination unit. In the freezing presence-absence determination, freezing determination is made when the exhaust flow rate of gas is equal to or lower than a first threshold. In the thawing presence-absence determination, thawing determination indicating that the exhaust and drain valve is thawed is made when the exhaust flow rate of gas is higher than a second threshold. The second threshold shows a flow rate higher than the first threshold.

5 Claims, 10 Drawing Sheets

(56) References Cited

U.S. PATENT DOCUMENTS

| | | | | |
|---|---|---|---|---|
| 2010/0159340 A1* | 6/2010 | Oomori | ............ | H01M 8/04455 |
| | | | | 429/432 |
| 2012/0021320 A1 | 1/2012 | Kusumura et al. | | |
| 2014/0377671 A1* | 12/2014 | Milacic | ............... | H01M 8/0662 |
| | | | | 429/410 |
| 2016/0141650 A1 | 5/2016 | Maruo et al. | | |
| 2016/0372768 A1* | 12/2016 | Procter | ............ | H01M 8/04529 |

FOREIGN PATENT DOCUMENTS

| | | |
|---|---|---|
| JP | 2013-179064 | 9/2013 |
| JP | 2016-096081 A | 5/2016 |

* cited by examiner

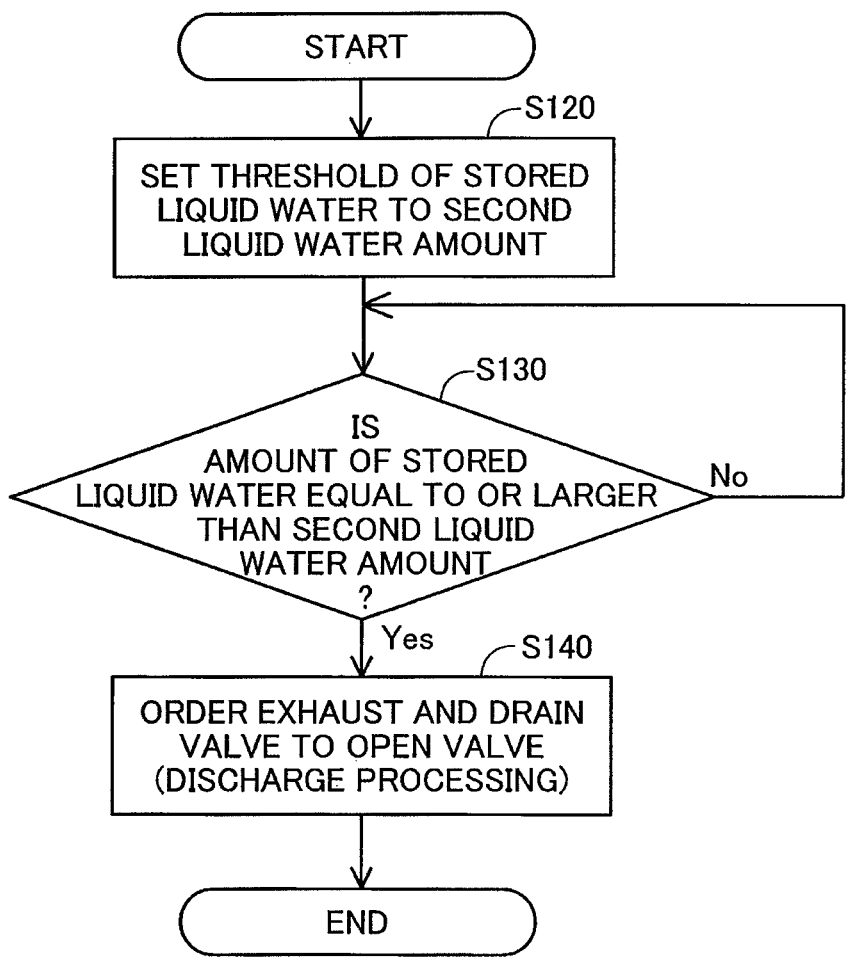

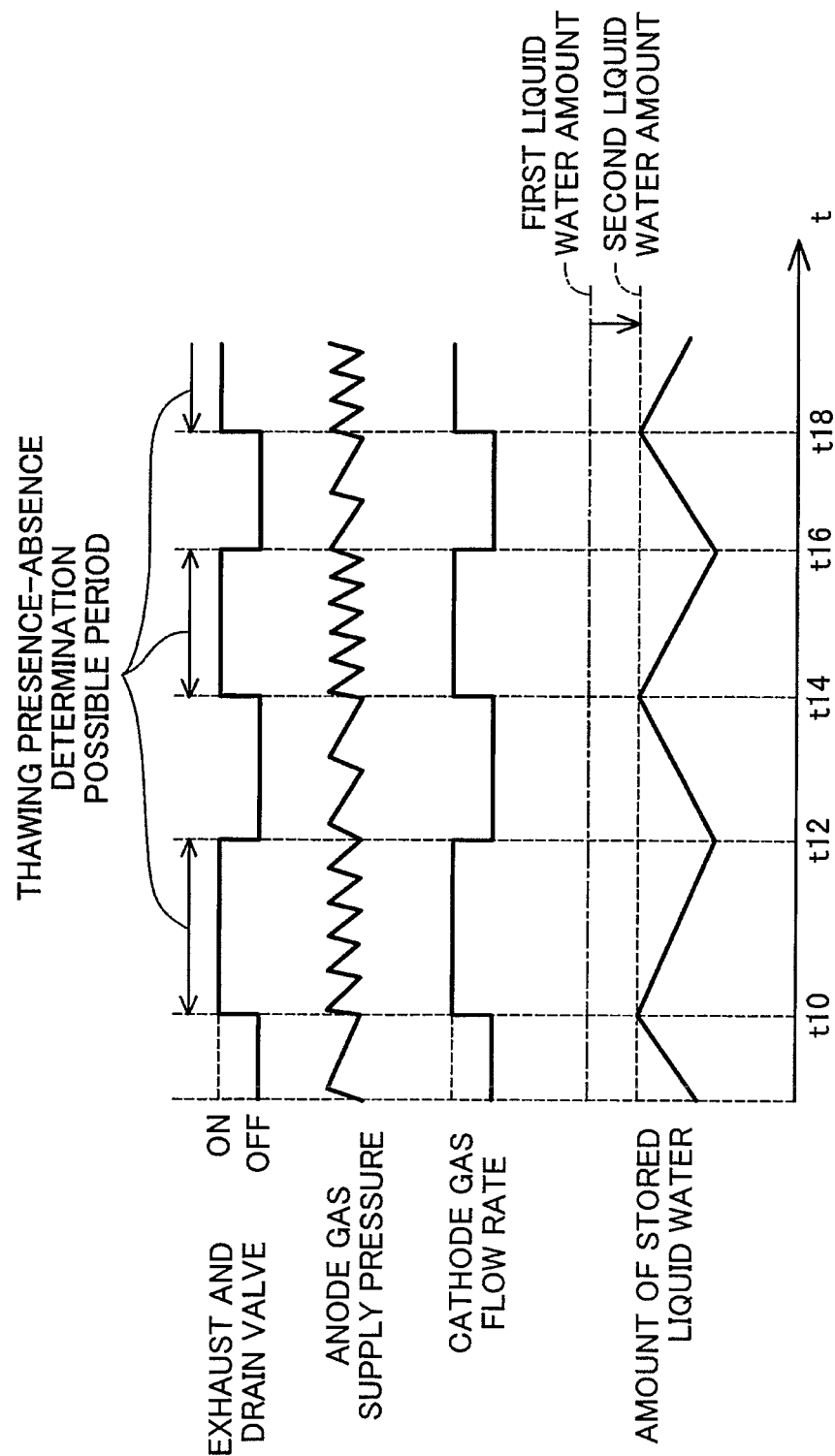

FUEL CELL SYSTEM

CROSS REFERENCE TO RELATED APPLICATION

This application claims priority to Japanese Patent Application No. 2018-143307, filed Jul. 31, 2018, the disclosure of which is incorporated by reference herein in its entirety.

BACKGROUND

Field

The present disclosure relates to a technology of a fuel cell system.

Related Art

Conventionally, there is known, in a fuel cell system, a technology of performing freezing presence-absence determination of whether an exhaust and drain valve is frozen and thawing presence-absence determination of whether an exhaust and drain valve is thawed (Japanese Patent Application No. 2011-3465). Moreover, in the conventional technology, when the thawing determination has been made indicating that the exhaust and drain valve is thawed, the thawing processing (temperature raising processing) is performed to eliminate freezing.

SUMMARY

In the conventional technology, even if the exhaust and drain valve is not sufficiently thawed, the thawing determination may be made depending on a threshold for performing thawing presence-absence determination. In this case, when the freezing presence-absence determination is performed again, it is highly possible that the freezing determination is made indicating that the exhaust and drain valve is frozen, and every time the freezing determination is made, the thawing processing needs to be performed. For example, when the freezing presence-absence determination is performed at the start of the fuel cell system, as in the conventional technology, the freezing determination is made every time the fuel cell system is started, and the thawing processing needs to be performed every time the freezing determination is made.

Solution to Problem

The present disclosure may be achieved by the following aspects.

One aspect of the present disclosure provides a fuel cell system. The fuel cell system includes a fuel cell, a temperature sensor that measures an environmental temperature of the fuel cell, an anode gas supply system that supplies anode gas to the fuel cell and includes an anode gas supply path in which anode gas toward the fuel cell flows, an anode gas circulation system that lets anode offgas discharged from the fuel cell circulate to the anode gas supply path and includes an anode gas circulation path in which the anode offgas toward the anode gas supply path flows, an exhaust and drain path that connects the anode gas circulation path to an outside, an exhaust and drain valve that opens and closes the exhaust and drain path, and a controller that controls actions of the fuel cell system, in which the controller includes a freezing presence-absence determination unit that performs freezing presence-absence determination of whether the exhaust and drain valve is frozen using an exhaust flow rate of gas discharged from the exhaust and drain valve, when the fuel cell system is started and if a measurement value of the temperature sensor is below freezing point and the exhaust and drain valve is ordered to open the valve, a temperature raising execution unit that performs temperature raising processing for raising a temperature of the exhaust and drain valve when the freezing presence-absence determination unit has made freezing determination indicating that the exhaust and drain valve is frozen, and a thawing presence-absence determination unit that performs thawing presence-absence determination of whether the exhaust and drain valve is thawed using an exhaust flow rate of the anode offgas when the exhaust and drain valve is ordered to open the valve at least either during the temperature raising processing or after the temperature raising processing, in the freezing presence-absence determination, the freezing determination is made when the exhaust flow rate of the anode offgas is equal to or lower than a first threshold, in the thawing presence-absence determination, thawing determination indicating that the exhaust and drain valve is thawed is made when the exhaust flow rate of the anode offgas is higher than a second threshold, and the second threshold shows a flow rate higher than the first threshold.

BRIEF DESCRIPTION OF THE DRAWINGS

FIG. 9 is a flowchart performed by a controller according to a fourth embodiment; and FIG. 10 is a timing chart of the flow chart illustrated in FIG. 9.

DETAILED DESCRIPTION

A. First Embodiment

Figure 1:
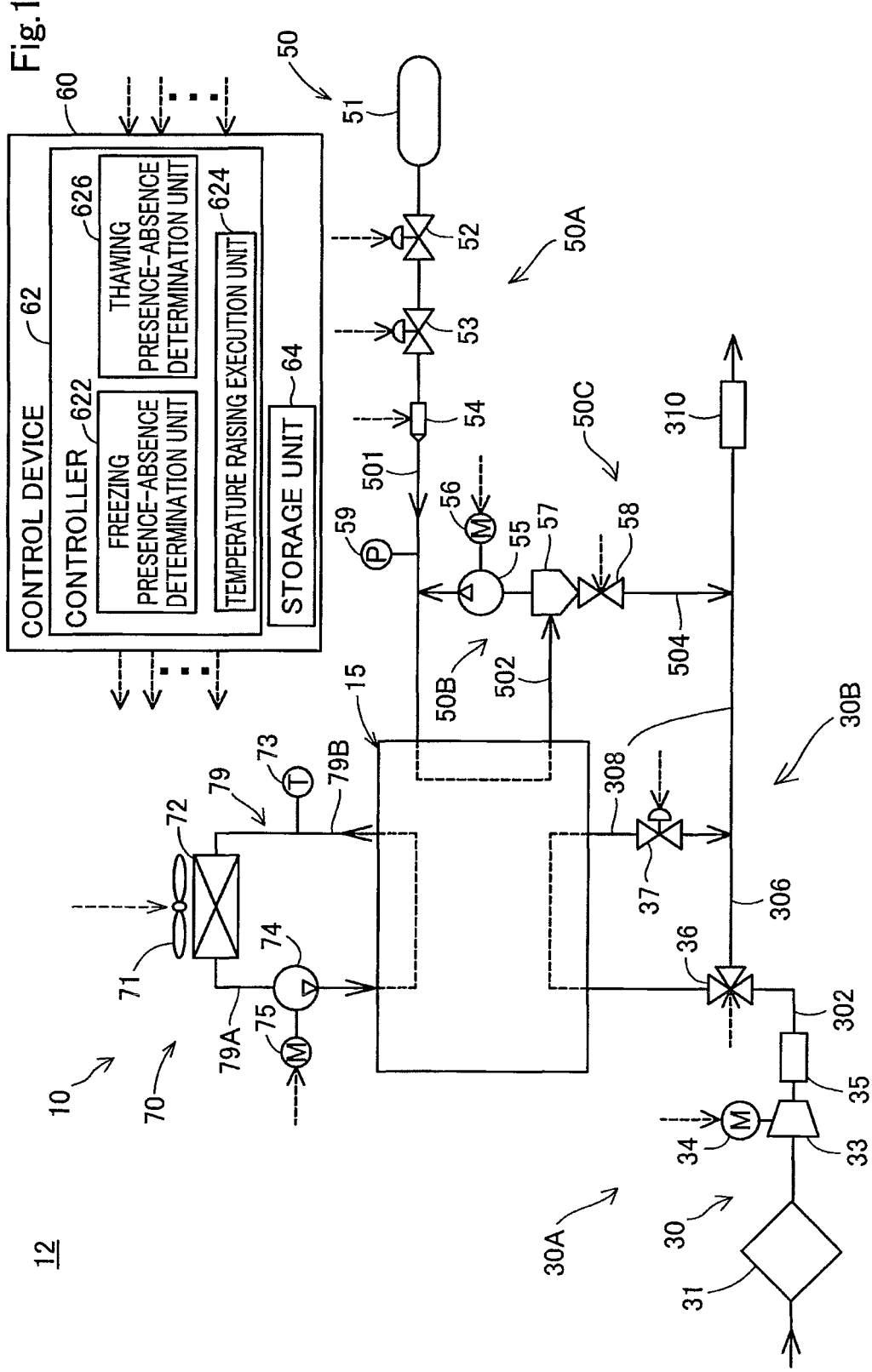
FIG. 1 is an explanatory diagram systematically illustrating a fuel cell system according to a first embodiment.

FIG. 1 is an explanatory diagram systematically illustrating a fuel cell system 10 according to the first embodiment. The fuel cell system 10 of the first embodiment is provided in a fuel cell vehicle 12, for example, and is used as a power generation device for driving a drive motor of the fuel cell vehicle 12. The fuel cell system 10 includes a fuel cell 15, a cathode gas supply-discharge system 30, an anode gas supply-discharge system 50, a refrigerant circulation system 70, and a control device 60.

The control device 60 includes a controller 62 and a storage unit 64. The controller 62 executes various programs stored in the storage unit 64 to control actions of the fuel cell system 10. The storage unit 64 stores various programs and various thresholds used for freezing presence-absence determination and thawing presence-absence determination, which are described later.

The fuel cell 15 is a solid polymer type fuel cell that receives supply of cathode gas and anode gas as reaction gas and generates power by electrochemical reaction between oxygen and hydrogen. In the first embodiment, cathode gas is air, and anode gas is hydrogen gas. The fuel cell 15 has a stacking structure in which pluralities of unit cells are stacked. Each of the unit cells is a power generation element capable of individually generating power. The unit cell includes a membrane electrode assembly and two separators sandwiching the membrane electrode assembly. The membrane electrode assembly includes an electrolyte membrane, an anode provided on one surface of the electrolyte membrane, and a cathode provided on the other surface of the electrolyte membrane. The electrolyte membrane is a solid polymer thin film showing preferable proton conductivity when it is wet with water contained therein. On the outer peripheral end of each of the unit cells, there is provided a manifold (not illustrated) for reaction gas that is extended in a stacking direction of the unit cells and branched to a power generation part of each cell. The stacked unit cells are sandwiched and tightened in a stacking direction.

The cathode gas supply-discharge system 30 supplies cathode gas to the fuel cell 15 and discharges cathode gas to the outside. The cathode gas supply-discharge system 30 includes a cathode gas supply system 30A and a cathode gas discharge system 30B. The cathode gas supply system 30A supplies cathode gas to the fuel cell 15. The cathode gas supply system 30A includes a cathode gas supply path 302, an air cleaner 31, a compressor 33, a motor 34, an intercooler 35, and a flow dividing valve 36.

The cathode gas supply path 302 is a pipe arranged on the upstream side of the fuel cell 15 to connect a cathode of the fuel cell 15 to the outside. The air cleaner 31 is provided on the upstream side than the compressor 33 in the cathode gas supply path 302 to remove foreign substances in cathode gas supplied to the fuel cell 15. The compressor 33 is provided in the cathode gas supply path 302 on the upstream side than the fuel cell 15 to feed compressed air to the cathode in accordance with an order from the controller 62. The compressor 33 is driven by the motor 34 operating in accordance with an order from the controller 62. The intercooler 35 is provided on the downstream side than the compressor 33 in the cathode gas supply path 302. The intercooler 35 cools cathode gas compressed by the compressor 33 and heated to a high temperature. The flow dividing valve 36 is a three-way valve, for example. The controller 62 adjusts an opening of the flow dividing valve 36 to adjust a flow rate of cathode gas flowing to the fuel cell 15 from the cathode gas supply path 302 and a flow rate of cathode gas flowing in a bypass path 306 branched from the cathode gas supply path 302 and not passing the fuel cell 15. The bypass path 306 is connected to a cathode gas discharge path 308 described later. The cathode gas flowing in the bypass path 306 passes the cathode gas discharge path 308 and is discharged to the outside.

The cathode gas discharge system 30B discharges cathode gas to the outside. The cathode gas discharge system 30B includes a cathode gas discharge path 308, the bypass path 306, and a regulating valve 37. The cathode gas discharge path 308 is a pipe for discharging cathode gas from the fuel cell 15 (also referred to as "cathode offgas") and cathode gas flowing in the bypass path 306 to the outside. The regulating valve 37 adjusts, through adjustment of its opening by the controller 62, a back pressure of a flow path on the cathode side of the fuel cell 15. The regulating valve 37 is provided on the upstream side than a position connected to the bypass path 306 in the cathode gas discharge path 308. A muffler 310 is provided at the end on the downstream side of the cathode gas discharge path 308.

The anode gas supply-discharge system 50 includes an anode gas supply system 50A, an anode gas circulation system 50B, and an anode gas discharge system 50C.

The anode gas supply system 50A supplies anode gas to the fuel cell 15. The anode gas supply system 50A includes an anode gas tank 51, an anode gas supply path 501, a switching valve 52, a regulator 53, an injector 54, and a pressure sensor 59. The anode gas tank 51 stores high-pressure hydrogen gas, for example. The anode gas supply path 501 is a pipe connected to the anode gas tank 51 and the fuel cell 15, in which anode gas from the anode gas tank 51 to the fuel cell 15 flows. The switching valve 52 allows, when it is open, anode gas in the anode gas tank 51 to flow to the downstream side. By the control of the controller 62, the regulator 53 adjusts a pressure of anode gas on the upstream side than the injector 54. The injector 54 is provided on the upstream side than a merging point of an anode gas circulation path 502 described later in the anode gas supply path 501. The injector 54 is a switching valve driven electromagnetically in accordance with a driving cycle and valve-opening time set by the controller 62, and adjusts an anode gas supply amount supplied to the fuel cell 15. The pressure sensor 59 measures an inner pressure (supply pressure of anode gas) on the downstream side than the injector 54 in the anode gas supply path 501. The measurement result is transmitted to the control device 60.

The anode gas circulation system 50B lets anode gas discharged from the fuel cell 15 (also referred to as "anode offgas") circulate again in the anode gas supply path 501. The anode gas circulation system 50B includes an anode gas circulation path 502, a gas-liquid separator 57, a circulation pump 55, and a motor 56. The anode gas circulation path 502 is a pipe connected to the fuel cell 15 and the anode gas supply path 501, in which anode offgas toward the anode gas supply path 501 flows. The gas-liquid separator 57 is provided in the anode gas circulation path 502 to separate liquid water from anode offgas containing liquid water. The motor 56 is driven, whereby the circulation pump 55 lets anode offgas in the anode gas circulation path 502 circulate toward the anode gas supply path 501.

The anode gas discharge system 50C discharges anode offgas and liquid water generated by power generation of the fuel cell 15 to the outside. The anode gas discharge system 50C includes an exhaust and drain path 504 and an exhaust and drain valve 58. The exhaust and drain path 504 is a pipe connecting an exhaust port of the gas-liquid separator 57 for discharging liquid water and the outside.

The exhaust and drain valve 58 is provided in the exhaust and drain path 504 to open and close the exhaust and drain path 504. As the exhaust and drain valve 58, a diaphragm valve is used, for example. In the normal operation of the fuel cell system 10, the controller 62 orders the exhaust and drain valve 58 to open the valve at predetermined timing, and controls opening and closing of the injector 54 to supply anode gas to the downstream side (normal discharge processing). The normal operation of the fuel cell system 10 is the operation performed in a case where it is determined that the exhaust and drain valve 58 is not frozen or is thawed, as described later. The normal discharge processing opens the exhaust and drain valve 58, whereby nitrogen gas that is impurity gas contained in anode offgas is discharged together with liquid water to the outside through the exhaust and drain path 504. The predetermined timing is when the amount of liquid water stored in the gas-liquid separator 57 becomes equal to or larger than a predetermined first liquid water amount, for example. Note that in the normal discharge processing, the circulation pump 55 may be driven or stopped. The controller 62 estimates an amount of liquid water stored in the gas-liquid separator 57 using a power generation amount of the fuel cell 15. Alternatively, in another embodiment, at least one water level sensor is arranged in the gas-liquid separator 57, so as to obtain a water storage amount on the basis of detection signals from the water level sensor. The water level sensor is arranged in accordance with a threshold of a water storage amount used by the controller 62 for control, for example. For example, if the normal discharge processing is performed when the liquid water amount in the gas-liquid separator 57 is equal to or larger than a first liquid water amount, the water level sensor is arranged at a position corresponding to the first liquid water amount.

The refrigerant circulation system 70 adjusts a temperature of the fuel cell 15 using a refrigerant. As the refrigerant, water, or antifreeze such as ethylene glycol is used. The refrigerant circulation system 70 includes a refrigerant circulation path 79, a refrigerant circulation pump 74, a motor 75, a radiator 72, a radiator fan 71, and a temperature sensor 73.

The refrigerant circulation path 79 includes a refrigerant supply path 79A and a refrigerant discharge path 79B. The refrigerant supply path 79A is a pipe for supplying a refrigerant to the fuel cell 15. The refrigerant discharge path 79B is a pipe for discharging a refrigerant from the fuel cell 15. The motor 75 is driven, whereby the refrigerant circulation pump 74 feeds a refrigerant in the refrigerant supply path 79A to the fuel cell 15. The radiator fan 71 sends air to radiate heat, so that the radiator 72 cools a refrigerant flowing inside thereof. The temperature sensor 73 measures a temperature of a refrigerant in the refrigerant discharge path 79B. The measurement result of a temperature of the refrigerant is transmitted to the controller 62.

The controller 62 includes a freezing presence-absence determination unit 622, a temperature raising execution unit 624, and a thawing presence-absence determination unit 626. The freezing presence-absence determination unit 622 performs freezing presence-absence determination for the exhaust and drain valve 58 when a measurement value of the temperature sensor 73 is below freezing point and if the exhaust and drain valve 58 is ordered to open the valve. The freezing presence-absence determination determines whether the exhaust and drain valve 58 is frozen using an exhaust flow rate of anode offgas that is gas discharged from the exhaust and drain valve 58 in a period in which the exhaust and drain valve 58 is ordered to open the valve. In the freezing presence-absence determination, when the exhaust flow rate of anode offgas is equal to or lower than a first threshold Lt, freezing determination indicating that the exhaust and drain valve 58 is frozen is made.

The temperature raising execution unit 624 performs temperature raising processing for raising the temperature of the exhaust and drain valve 58 when the freezing determination has been made. The temperature raising execution unit 624 performs temperature raising processing by rapid warm-up operation of the fuel cell system 10 until a predetermined condition is fulfilled. That is, the rapid warm-up operation raises the temperature of the fuel cell 15, whereby the temperature raising execution unit 624 heats the exhaust and drain valve 58 arranged around the fuel cell 15 using heat from the fuel cell 15. The predetermined condition may include, for example, a period in which the temperature raising processing is performed, or a temperature measured by the temperature sensor 73 equal to or higher than a predetermined temperature (e.g., 60° C.). The rapid warm-up operation is operation in which a cathode gas stoichiometric ratio is lowered as compared with a case of normal operation of the fuel cell system 10 when it is determined that the exhaust and drain valve 58 is not frozen. The cathode gas stoichiometric ratio is a ratio of a supply amount of cathode gas relative to a theoretical supply amount of cathode gas found theoretically using a power generation amount of the fuel cell 15. In the normal operation, the cathode gas stoichiometric ratio is set to about 1.5 to 2.0. On the other hand, in rapid warm-up operation, the cathode gas stoichiometric ratio is set to about 0.9 to 1.1. Moreover, instead of rapid warm-up operation, the temperature raising processing may be performed by warm-up operation with a cathode stoichiometric ratio higher than the case of rapid warm-up operation. The warm-up operation in "Solution to Problem" is not limited to rapid warm-up operation, and may be any operation by which the generation of heat of the fuel cell 15 exceeds radiation of heat thereof. The temperature raising processing is performed by warm-up operation including rapid warm-up operation, which makes another device such as a heater unnecessary for temperature raising processing. Note that in another embodiment, the temperature raising execution unit 624 may heat the exhaust and drain valve 58 using a heater for temperature raising processing. In this case, the thawing presence-absence determination described later is performed during temperature raising processing in which the exhaust and drain valve 58 is heated by a heater or after temperature raising processing in which the exhaust and drain valve 58 is heated by a heater.

In a case where the exhaust and drain valve 58 is ordered to open the valve, the thawing presence-absence determination unit 626 performs thawing presence-absence determination of whether the exhaust and drain valve 58 is thawed using an exhaust flow rate of anode offgas that is gas discharged from the exhaust and drain valve 58 in a period in which the exhaust and drain valve 58 is ordered to open the valve. In the thawing presence-absence determination, when the exhaust flow rate of anode offgas from the exhaust and drain valve 58 is equal to or lower than a second threshold Lp, the thawing determination indicating that the exhaust and drain valve 58 is thawed is made. The second threshold Lp shows a higher flow rate than the first threshold Lt. The details of the first threshold Lt and the second threshold Lp will be described later.

Figure 2:
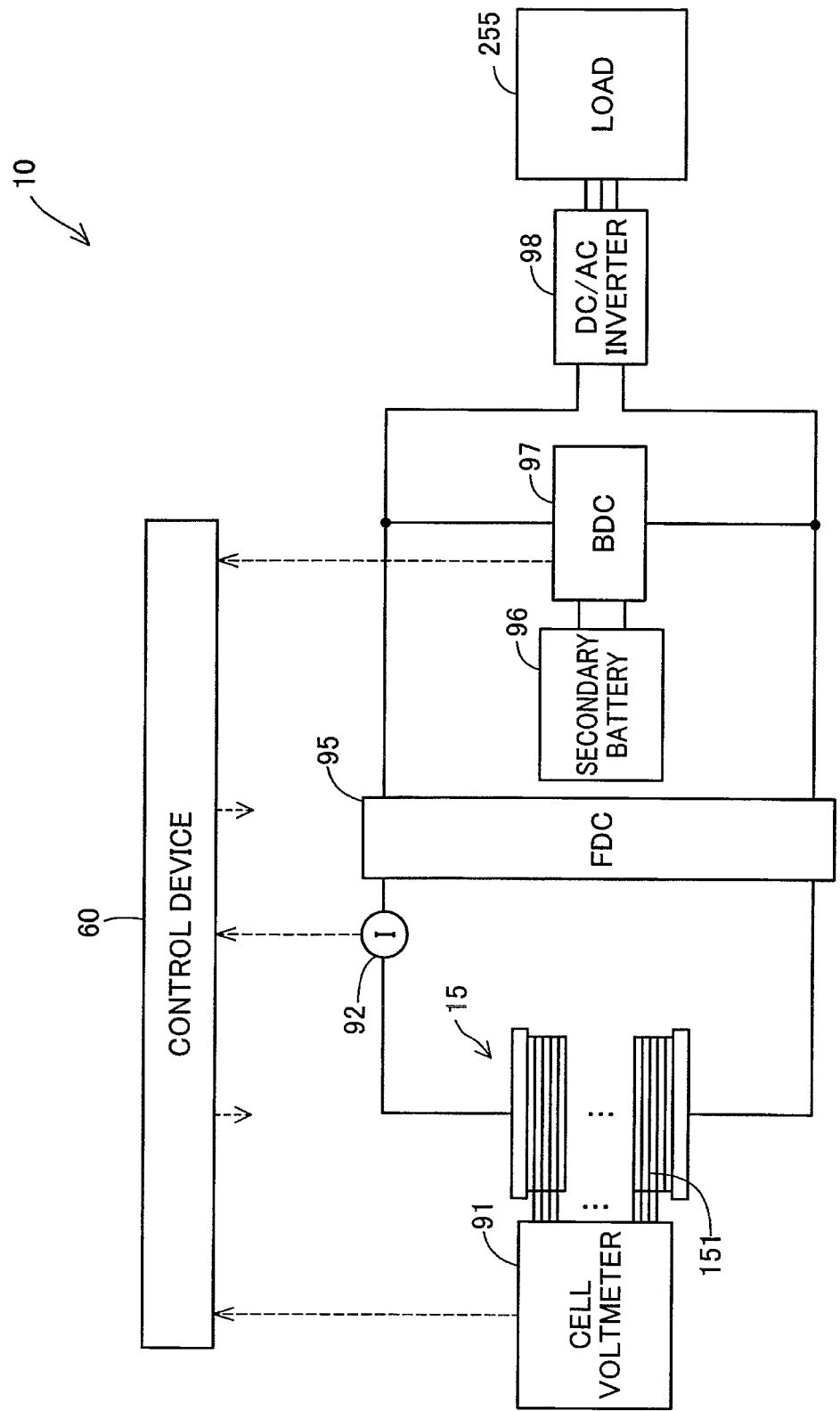
FIG. 2 is a conceptual diagram illustrating an electric configuration of a fuel cell system.

FIG. 2 is a conceptual diagram illustrating an electric configuration of the fuel cell system 10. The fuel cell system 10 includes an FDC 95, a DC/AC inverter 98, a cell voltmeter 91, and a current sensor 92.

The cell voltmeter 91 is connected to each of all unit cells 151 of the fuel cell 15, and measures a cell voltage of each of all unit cells 151. The cell voltmeter 91 transmits the measurement results to the control device 60. The current sensor 92 measures a value of an output current from the fuel cell 15 and transmits the measurement result to the control device 60.

The FDC 95 is a circuit formed as a DC/DC converter. The FDC 95 controls an output voltage of the FDC 95 on the basis of a voltage command value transmitted from the control device 60. The FDC 95 controls an output current by the fuel cell 15 on the basis of a current command value transmitted from the control device 60. The current command value is a target value of an output current by the fuel cell 15, and is set by the control device 60. The control device 60 calculates a required current value using a required power amount of the fuel cell 15 to generate a current command value.

The DC/AC inverter 98 is connected to the fuel cell 15 and a load 255. The DC/AC inverter 98 converts a DC power output from the fuel cell 15 into AC power and supplies the AC power to the load 255.

The fuel cell system 10 further includes a secondary battery 96 and a BDC 97. The secondary battery 96 is formed by a nickel-hydrogen battery or a lithium-ion battery, for example, and functions as an auxiliary power source. Moreover, the secondary battery 96 supplies power to the fuel cell 15 and charges power generated by the fuel cell 15 and regenerative power.

The BDC 97 is a circuit formed as a DC/DC converter together with the FDC 95, and controls charge and discharge of the secondary battery 96 in accordance with an order from the control device 60 as a controller. The BDC 97 measures a state of charge (SOC) of the secondary battery 96 and transmits the measurement result to the control device 60.

Figure 3:
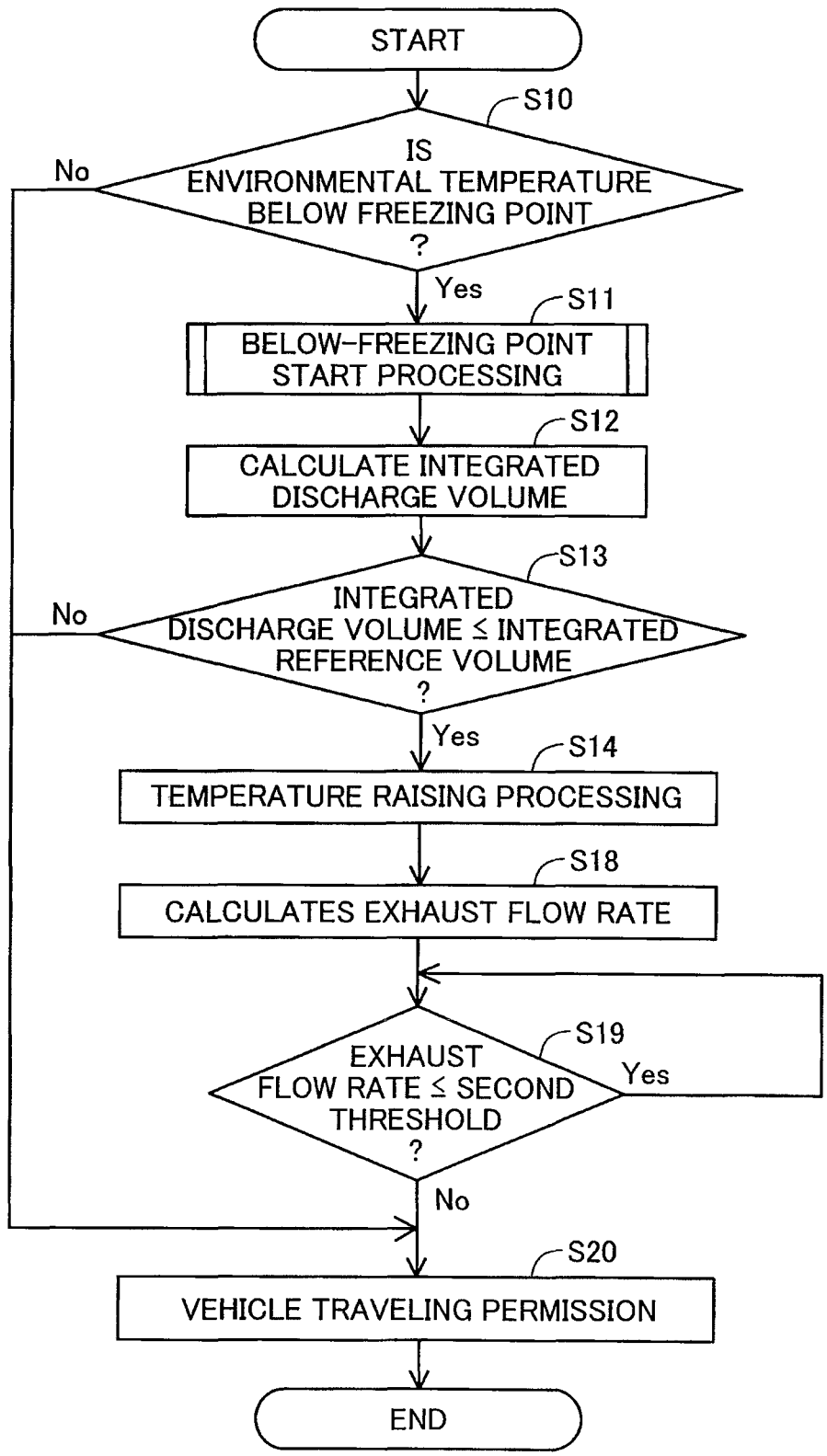
FIG. 3 is a flowchart including freezing presence-absence determination and thawing presence-absence determination of an exhaust and drain valve.
Figure 4:
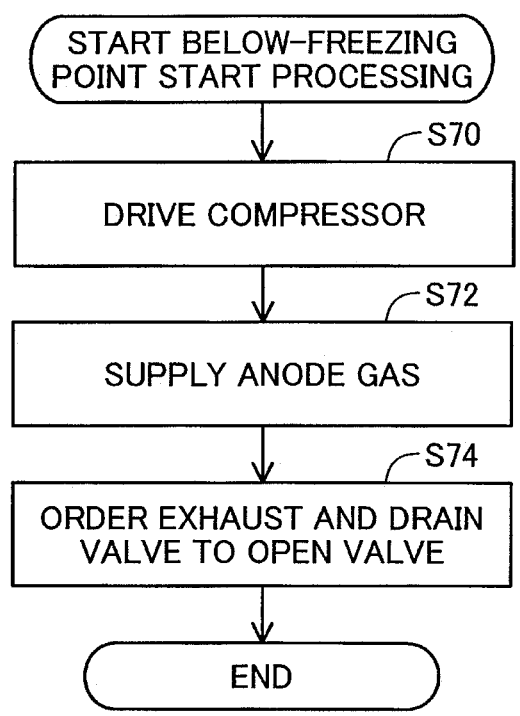
FIG. 4 is a flowchart of below-freezing point start processing.
Figure 5:
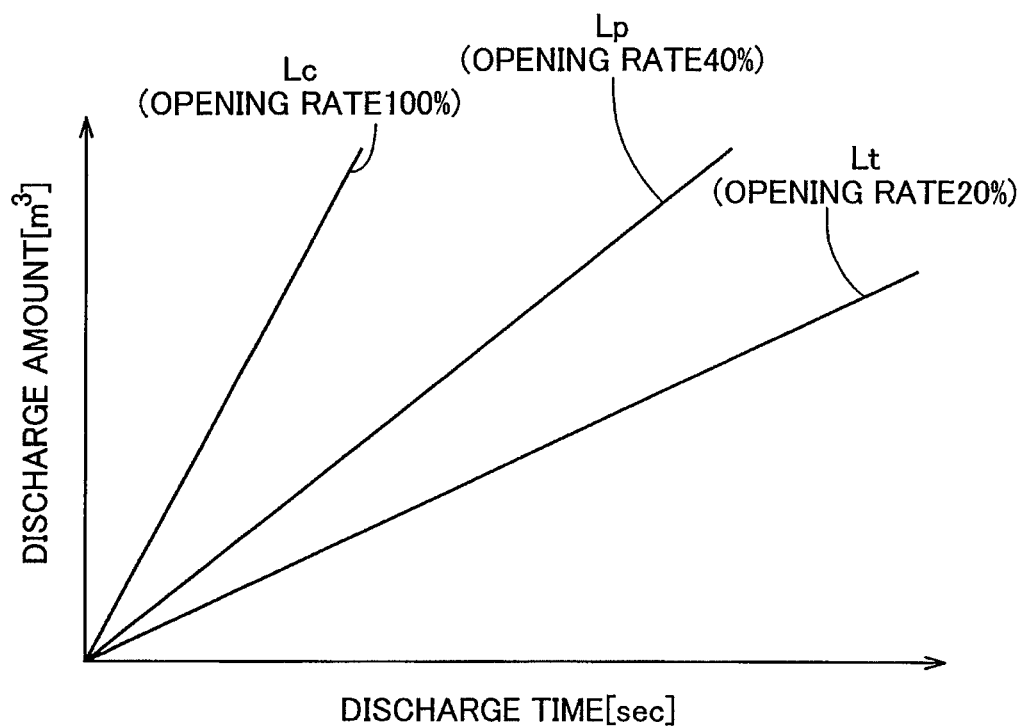
FIG. 5 is a graph illustrating characteristics of an exhaust and drain valve.

FIG. 3 is a flowchart including freezing presence-absence determination and thawing presence-absence determination of the exhaust and drain valve 58. FIG. 4 is a flowchart of below-freezing point start processing. FIG. 5 is a graph illustrating characteristics of the exhaust and drain valve 58. In the graph of FIG. 5, the vertical axis shows a discharge amount of anode offgas discharged from the exhaust and drain valve 58, and the horizontal axis shows discharge time. The flowchart illustrated in FIG. 3 is performed when the start switch of the fuel cell vehicle 12 is turned on and the fuel cell system 10 is started.

As illustrated in FIG. 3, the controller 62 determines whether an environmental temperature (Celsius) of the fuel cell system 10 is below a freezing point (Step S10). In the first embodiment, the environmental temperature is a refrigerant temperature of the refrigerant discharge path 79B obtained by the temperature sensor 73 (FIG. 1). Note that in another embodiment, the environmental temperature may be an outside air temperature or a temperature of the exhaust and drain valve 58. The outside air temperature may be obtained by an outside air temperature sensor arranged, for example. The temperature of the exhaust and drain valve 58 may be obtained by a temperature sensor arranged in the exhaust and drain valve 58.

When the determination at Step S10 is "No", the controller 62 performs Step S20. At Step S20, the controller 62 displays a traveling permitted state of the fuel cell vehicle 12 on a monitor or the like in the fuel cell vehicle 12 to notify a driver of vehicle traveling permission. For example, the controller 62 notifies a driver of vehicle traveling permission by. Meanwhile, when the determination at Step S10 is "Yes", the controller 62 performs below-freezing point start processing (Step S11). The below-freezing point start processing is processing for securing a required power generation amount of the fuel cell 15 even if freezing occurs in the fuel cell 15. To be more specific, the below-freezing point start processing is processing for replacing the inside of the anode by anode gas to increase a hydrogen gas concentration on the anode side of the fuel cell 15.

As illustrated in FIG. 4, in the below-freezing point start processing, the controller 62 drives the compressor 33 (Step S70). Next, the controller 62 controls the opening and closing of the injector 54 and supplies anode gas to the fuel cell 15 (Step S72). Moreover, the controller 62 orders the exhaust and drain valve 58 to open the valve (Step S74). Note that during the below-freezing point start processing, the circulation pump 55 is stopped to replace the inside of the anode of the fuel cell 15 by anode gas. The below-freezing point start processing is continued until the supply amount of anode gas to the anode of the fuel cell 15, which is calculated using a pressure value measured by the pressure sensor 59, becomes equal to or larger than the volume of the anode.

When the above-described below-freezing point start processing is performed and the exhaust and drain valve 58 is ordered to open the valve, the freezing presence-absence determination unit 622 performs freezing presence-absence determination of whether the exhaust and drain valve 58 is frozen (Step S12, Step S13), as illustrated in FIG. 3. That is, the freezing presence-absence determination is started with the order for opening the valve in the below-freezing point start processing as a starting point. The freezing presence-absence determination unit 622 calculates the integrated discharge volume [m$^3$] of anode offgas from the exhaust and drain valve 58 in a predetermined period Tc (e.g., for five seconds) (Step S12). Next, the freezing presence-absence determination unit 622 determines whether the calculated integrated discharge volume is equal to or smaller than a predetermined integrated reference volume [m$^3$] (Step S13). When the integrated discharge volume is equal to or smaller than the integrated reference volume, the freezing presence-absence determination unit 622 makes freezing determination indicating that the exhaust and drain valve 58 is frozen. Meanwhile, when the integrated discharge volume is larger than the integrated reference volume, the freezing presence-absence determination unit 622 makes non-freezing determination indicating that the exhaust and drain valve 58 is not frozen.

The predetermined integrated reference volume is a value found by multiplying the first threshold Lt by the predetermined period Tc. That is, at Step S12, the freezing presence-absence determination unit 622 determines whether the exhaust flow rate [m$^3$/sec] of anode offgas from the exhaust and drain valve 58 is equal to or lower than the first threshold Lt. Then, when the exhaust flow rate is equal to or lower than the first threshold Lt, the freezing determination is made.

As illustrated in FIG. 5, it is supposed that Lc is an exhaust flow rate of anode offgas discharged from the exhaust and drain valve 58 when the opening rate of the exhaust and drain valve 58 is 100%. The opening rate is a proportion (%) of an actual flow path cross sectional area of the exhaust and drain valve 58 relative to a flow path cross sectional area of the exhaust and drain valve 58 in a case where the exhaust and drain valve 58 does not have any defect and is opened as designed. The first threshold Lt is set to an exhaust flow rate of when the opening rate of the exhaust and drain valve 58 is lower than 100%. The first threshold Lt is set in a range where the required minimum exhaust performance is achieved in the normal discharge processing, for example. In the first embodiment, the first threshold Lt is set to an exhaust flow rate of when the opening rate is 20%. Note that the exhaust flow rate is varied depending on a temperature of the fuel cell 15, a supply pressure of anode gas to the fuel cell 15, and the like.

The freezing presence-absence determination unit 622 calculates and obtains an exhaust flow rate of anode offgas using the following expressions (1) to (4).

$$\Delta P = f(Qv_{in} - Qv_{crs} - Qv_{FC} - Qv_{ex}) \quad \text{expression (1)}$$

Here, ΔP is a pressure drop amount [Pa] measured by the pressure sensor 59 in the predetermined period Tc (e.g., for five seconds). $Qv_{in}$ is a supply amount [m³] of anode gas supplied from the injector 54 to the downstream side in the period Tc. Moreover, $Qv_{crs}$ is a hydrogen permeation amount [m³] from the anode to the cathode of the fuel cell 15 in the period Tc. $Qv_{FC}$ is an anode gas amount [m³] consumed by power generation of the fuel cell 15 in the period Tc. $Qv_{ex}$ is an amount of anode gas discharged from the exhaust and drain valve 58 in the period Tc. f represents a function. $Qv_{in}$, $Qv_{crs}$, $Qv_{FC}$ are expressed by the volume in a standard state.

$Qv_{in}$ is calculated by an orifice expression using a differential pressure between the downstream side and the upstream side of the flow path where the injector 54 is interposed. The determination at Step S12 of FIG. 3 is preferably performed while the operation of the injector 54 is stopped, that is, during closing operation in opening-closing operation for supplying anode gas to the fuel cell 15. During such closing operation, "0" is substituted for $Qv_{in}$. $Qv_{crs}$ is calculated on the basis of a hydrogen partial pressure difference between both electrodes. For the determination at Step S12, $Qv_{crs}$ may be considered to be "0" because the hydrogen permeation amount is considerably small.

$Qv_{FC}$ is calculated by the following expression (2).

$$Qv_{FC} = (I/F) \times (1/2) \times N \times 22.4 \times 10^{-3} \qquad (2)$$

Here, I is a measured current value [A] by the current sensor 92, F is the number of Faradays, and N is the number of stacked unit cells 151. $22.4 \times 10^{-3}$ is a volume [m³/mol] per mol of gas in a standard state.

In the above-described expression (1), "0" is substituted for $Qv_{in}$, and "0" is substituted for $Qv_{crs}$, which leads to the following expression (3), and the expression (3) leads to the expression (4).

$$\Delta P = f(-Qv_{FC} - Qv_{ex}) \qquad \text{expression (3)}$$

$$Qv_{ex} = [\{V \times (\Delta P/Ps) \times (273/(273+T))\}] - Qv_{FC} \qquad \text{expression (4)}$$

In the expression (4), V is the volume [m³] in which anode gas may flow in the downstream side of the injector 54 while the exhaust and drain valve 58 is closed, and is the total volume of the downstream side than the injector 54 in the anode gas supply path 501, a manifold where the anode of the fuel cell 15 flows, the anode gas circulation path 502, and the gas-liquid separator 57. Moreover, in the expression (4), Ps is a standard pressure and is 101.3 kPa in the first embodiment. T is a temperature in the environment (environmental temperature) where the fuel cell system 10 is arranged, and is a measurement value of the temperature sensor 73 in the first embodiment.

The controller 62 substitutes the above-described expression (2) for the above-described expression (4) to calculate $Qv_{ex}$. However, when the fuel cell 15 does not generate power, $Qv_{FC}$ is "0". The exhaust flow rate is calculated by dividing $Qv_{ex}$ by the period Tc.

When the determination at Step S13 of FIG. 3 is "No", that is, when the freezing presence-absence determination unit 622 has made non-freeing determination indicating that the exhaust and drain valve 58 is not frozen, Step S20 is performed.

Meanwhile, when the determination at Step S13 is "Yes", that is, the freezing presence-absence determination unit 622 has made freezing determination, the temperature raising execution unit 624 performs rapid warm-up operation as temperature raising processing (Step S14).

When predetermined time has elapsed since the temperature raising processing starts and if a predetermined start condition is fulfilled, the thawing presence-absence determination unit 626 performs thawing presence-absence determination of the exhaust and drain valve 58 (Steps S18, S19). The predetermined start condition is, for example, a condition that in a state where the fuel cell system 10 is in operation with low loads, and the amount of liquid water of the gas-liquid separator 57 is equal to or larger than a predetermined first liquid water amount, the controller 62 has ordered the exhaust and drain valve 58 to open the valve. The operation with low loads is a state in which loads connected to the fuel cell 15 is equal to or smaller than a predetermined value (e.g., two kilo watts) such as in idling operation while the fuel cell vehicle 12 is stopped. Moreover, the operation with low loads also includes the state in which the temperature raising processing by warm-up operation is being performed. In thawing presence-absence determination, the thawing presence-absence determination unit 626 calculates an exhaust flow rate [m³/sec] of anode offgas from the exhaust and drain valve 58 using a change of a pressure measured by the pressure sensor 59 (Step S18). Next, the thawing presence-absence determination unit 626 determines whether the calculated exhaust flow rate is equal to or lower than the second threshold Lp (Step S19). When the exhaust flow rate is higher than the second threshold Lp, the thawing presence-absence determination unit 626 makes thawing determination indicating that ice of the exhaust and drain valve 58 is melted and the exhaust and drain valve 58 is thawed. Meanwhile, when the exhaust flow rate is equal to or lower than the second threshold Lp, the thawing presence-absence determination unit 626 makes non-thawing determination indicating that the exhaust and drain valve 58 is not thawed.

As illustrated in FIG. 5, the second threshold Lp is set to an exhaust flow rate of when the opening rate of the exhaust and drain valve 58 is lower than 100%. Moreover, the second threshold Lp is set to a higher value than the first threshold Lt. The second threshold Lp is preferably 1.2 times or more of the first threshold Lt, for example, and is more preferably 1.5 times or more of the first threshold Lt. In the first embodiment, the second threshold Lp is set to an exhaust flow rate of when the opening rate is 40%.

The thawing presence-absence determination unit 626 calculates an exhaust flow rate $Q_{ex}$ of anode offgas using the following expression (5).

$$Q_{ex} = [\{V \times (Pv/Ps) \times (273/(273+T))\}] - Q_{FC} \qquad \text{expression (5)}$$

In the expression (5), V is the volume in which anode gas may flow in the downstream side of the injector 54 while the exhaust and drain valve 58 is closed, and is the total volume of the downstream side than the injector 54 in the anode gas supply path 501, a manifold where the anode of the fuel cell 15 flows, the anode gas circulation path 502, and the gas-liquid separator 57. Moreover, in the expression (5), Ps is a standard pressure and is 101.3 kPa in the first embodiment. Pv is a pressure drop speed [P/sec] of anode gas in the anode gas supply path 501, which is found by differentiating a measurement value (pressure) of the pressure sensor 59 with time. Moreover, T is an environmental temperature in which the fuel cell system 10 is arranged, and is a measurement value of the temperature sensor 73 in the first embodiment.

The thawing presence-absence determination unit 626 compares the exhaust flow rate $Q_{ex}$ with the second threshold Lp, and determines whether the exhaust flow rate $Q_{ex}$ is equal to or higher than the second threshold Lp to perform thawing presence-absence determination. When the determination at Step S19 of FIG. 3 is "No", the controller 62 notifies a driver of vehicle traveling permission (Step S20).

In the above-described first embodiment, the second threshold Lp used for thawing presence-absence determination shows a higher exhaust flow rate than the first threshold Lt used for freezing presence-absence determination. This reduces the possibility that the freezing determination is made when the fuel cell system 10 is stopped after thawing determination and the freezing presence-absence determination is performed at the next start of the fuel cell system 10. Therefore, it is possible to reduce the number of times of temperature raising processing performed to raise the temperature of the exhaust and drain valve 58. Especially in the period from turning-off of the start switch to turning-on thereof again, the fuel cell 15 does not generate power, and thus the temperature thereof is reduced. Thus, there is low possibility that ice of the exhaust and drain valve 58 is melted in this period, increasing the opening rate. Therefore, if the first threshold Lt and the second threshold Lp are set to the same value, when the start switch is turned on again and the below-freezing point start processing is performed, it is highly possible that the freezing determination is made. Meanwhile, if the second threshold Lp is set to a higher value than the first threshold Lt, the opening rate of the exhaust and drain valve 58 may be secured to some extent. This reduces the possibility that the freezing determination is made again after below-freezing point start processing.

B. Second Embodiment

Figure 6:
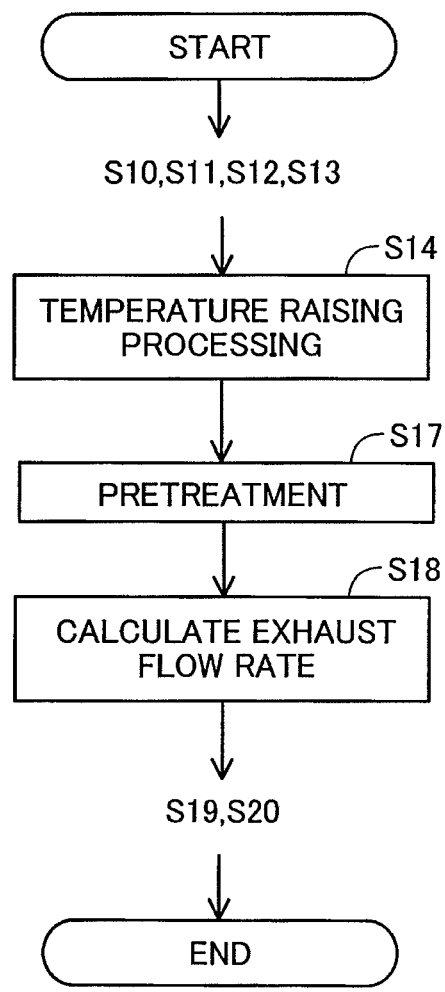
FIG. 6 is a flowchart including freezing presence-absence determination and thawing presence-absence determination of an exhaust and drain valve according to a second embodiment.

FIG. 6 is a flowchart including freezing presence-absence determination and thawing presence-absence determination of the exhaust and drain valve 58 according to the second embodiment. The flowchart of the second embodiment is different from the flowchart of the first embodiment (FIG. 3) in the aspect that the controller 62 performs a pretreatment before Step S18. The second embodiment is same as the first embodiment in the other steps. Thus, the same steps are represented with the same referential numerals and the description thereof is omitted. In the second embodiment, the control device 60 may perform the flowchart illustrated in FIG. 6 instead of the flowchart illustrated in FIG. 3.

The controller 62 performs a pretreatment (Step S17) after Step S14. The pretreatment is processing for performing thawing presence-absence determination more accurately. The pretreatment includes at least one of the following processing.

First pretreatment: increase a pressure of anode gas supplied to the fuel cell 15 as compared with when the normal discharge processing is being performed.

Second pretreatment: lower a flow rate of anode offgas circulating from the anode gas circulation path 502 to the anode gas supply path 501 as compared with when the normal discharge processing is being performed.

Third pretreatment: set a smaller current value of the fuel cell 15 than when the normal discharge processing is being performed.

In the first pretreatment, the controller 62 shortens opening intervals of the injector 54 or extends opening time thereof, for example, as compared with when the normal discharge processing is being performed. The supply pressure of anode gas in the first pretreatment may be equal to or higher than 110% or equal to or higher than 120% of the supply pressure of anode gas during normal discharge processing, for example. The upper limit of the supply pressure of anode gas in the first pretreatment is set to be smaller than an upper limit pressure that is an upper limit with which the parts of the anode gas supply-discharge system 50 are not damaged.

In the second pretreatment, the controller 62 stops the drive of the circulation pump 55 to lower a flow rate of anode offgas circulating in the anode gas supply path 501, for example. Moreover, in the second pretreatment, it is also possible to lower a flow rate of circulating anode offgas within a range in which the partial lack of hydrogen gas does not occur in the fuel cell 15, for example. In the third embodiment, the controller 62 sets a current value as a current command value to zero, for example. If the third pretreatment is performed, the lack of power supply for driving auxiliary machines such as the compressor 33 is covered by discharge of the secondary battery 96.

If at least one of the first pretreatment to the third pretreatment is performed at Step S17, the controller 62 may perform the following fourth pretreatment.

Fourth pretreatment: increase a flow rate of cathode gas flowing in the cathode gas discharge path 308, as compared with a flow rate of cathode gas flowing in the cathode gas discharge path 308 in normal discharge processing.

In the fourth pretreatment, the controller 62 increases the rotation speed of the compressor 33 to increase a flow rate of cathode gas, for example. Moreover, the flow rate of cathode gas in the fourth pretreatment may be equal to or higher than 110% or equal to higher than 120% of a flow rate of cathode gas in the normal discharge processing. Even if the first pretreatment, the second pretreatment, or the third pretreatment increases an amount of anode offgas discharged to the outside through the exhaust and drain valve 58, the fourth pretreatment dilutes hydrogen gas in anode offgas by cathode offgas. In this manner, it is possible to reduce the possibility that gas with high hydrogen gas concentration is discharged to the outside through the cathode gas discharge path 308.

The above-described second embodiment exerts the same effects as the first embodiment in the aspect of same configurations as the above-described first embodiment. Moreover, the controller 62 performs, as a pretreatment, the first pretreatment for increasing a pressure of anode gas supplied to the fuel cell 15 as compared with when the normal discharge processing is being performed, thus exerting the following effects. That is, the exhaust flow rate $Q_{ex}$ of anode offgas from the exhaust and drain valve 58 is calculated using a drop speed (Pv) of the anode gas pressure. Thus, as the pressure of anode gas supplied to the fuel cell 15 is higher, the influence by other pressure fluctuation noises may be reduced relatively. This enables the controller 62 to perform thawing presence-absence determination more accurately. Moreover, as the pressure of supplied anode gas is higher, the exhaust flow rate $Q_{ex}$ of anode offgas is higher. Thus, it is possible to shorten time required for thawing presence-absence determination.

Moreover, the controller 62 performs, as a pretreatment, the second pretreatment for lowering a flow rate of anode offgas circulating in the anode gas supply path 501 flowing from the anode gas circulation path 502, as compared with when the normal discharge processing is being performed, thus exerting the following effects. That is, the flow rate of circulating anode offgas is lowered, which reduces pulsation of a pressure in an area where the pressure sensor 59 is arranged in the anode gas supply path 501. This reduces pressure fluctuation noises, making it possible to perform thawing presence-absence determination more accurately.

In addition, the controller 62 performs, as a pretreatment, the third pretreatment for setting a smaller current value of the fuel cell 15 than when the normal discharge processing is being performed, thus exerting the following effects. That is, if the current value of the fuel cell 15 is large, the amount of anode gas supplied to the fuel cell 15 and consumed by the fuel cell 15 becomes large. This increases pressure fluctuation noises of a pressure measured by the pressure sensor 59. Meanwhile, if a current value of the fuel cell 15 is set to be small by the third pretreatment, the consumption amount of anode gas by the fuel cell 15 is reduced. This reduces pressure fluctuation noises, making it possible to perform thawing presence-absence determination more accurately.

As described above, if at least one of the processing of the first pretreatment to the third pretreatment is performed, it is possible to reduce the possibility that a pressure measured by the pressure sensor 59 is varied due to elements other than anode offgas discharged from the exhaust and drain valve 58. Therefore, it is possible to further improve the calculation accuracy of the exhaust flow rate $Q_{ex}$ and thus perform thawing presence-absence determination more accurately.

C. Third Embodiment

Figure 7:
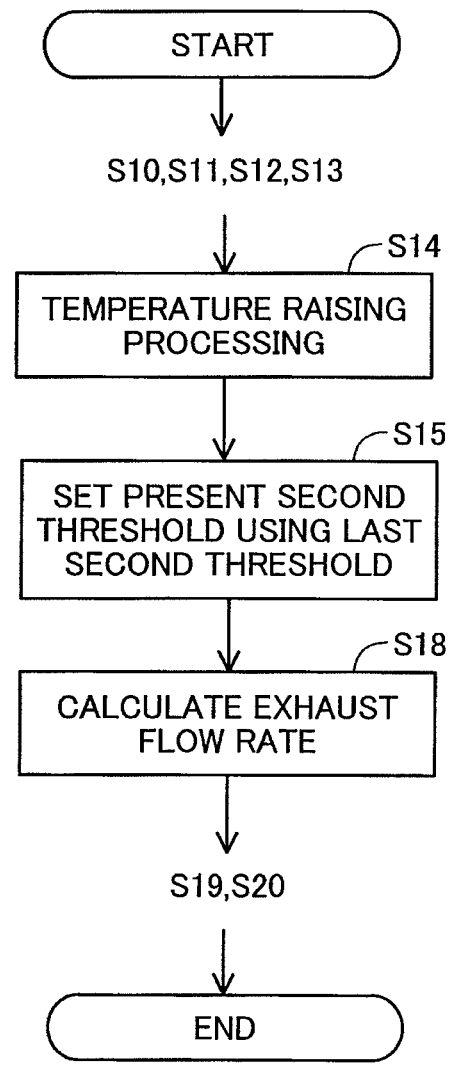
FIG. 7 is a flowchart including freezing presence-absence determination and thawing presence-absence determination of an exhaust and drain valve according to a third embodiment.

FIG. 7 is a flowchart including freezing presence-absence determination and thawing presence-absence determination of the exhaust and drain valve 58 according to the third embodiment. The flowchart of the third embodiment is different from the flowchart of the first embodiment (FIG. 3) in the aspect that the controller 62 sets the second threshold Lp before performing Step S18. The third embodiment is same as the first embodiment in the other steps. Thus, the same steps are represented with the same referential numerals and the description thereof is omitted. In the third embodiment, the control device 60 may perform the flowchart illustrated in FIG. 7 instead of the flowchart illustrated in FIG. 3.

After Step S14, the controller 62 sets the second threshold Lp (also referred to as a "present second threshold Lp") used for thawing presence-absence determination performed in the present below-freezing point start processing, using the second threshold Lp (also referred to as a "last second threshold Lp") used for thawing presence-absence determination (Step S18) performed in the last below-freezing point start processing (Step S15).

Figure 8:
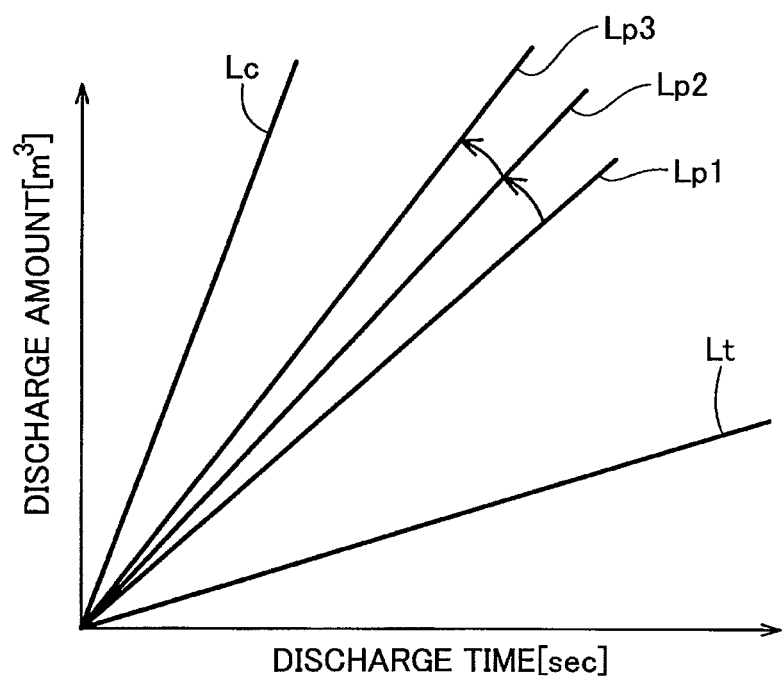
FIG. 8 is a diagram for explaining the setting of a present second threshold.

FIG. 8 is a diagram for explaining the setting of the present second threshold Lp. In FIG. 8, as a numerical value following the symbol Lp is larger, the threshold is used for thawing presence-absence determination performed in the later below-freezing point start processing. For example, the second threshold Lp3 is the present second threshold Lp3, the second threshold Lp2 is the last second threshold Lp2, and the second threshold Lp1 is a threshold used for thawing presence-absence determination performed in the below-freezing point start processing of the time before last. At Step S15, the controller 62 sets the present second threshold Lp3 so as to show a higher flow rate of anode offgas than the last second threshold Lp2. The controller 62 sets the present threshold Lp3 to be higher than the last second threshold Lp2 so that the opening rate is higher by 5%, for example.

The above-described third embodiment exerts the following effects in addition to the same effects as the above-described first embodiment. That is, it is possible to further reduce the possibility that the freezing determination is made when the fuel cell system 10 is stopped after thawing determination and the freezing presence-absence determination is performed at the next start of the fuel cell system 10. Note that in the flowchart illustrated in the third embodiment, the pretreatment of the second embodiment may be performed.

D. Fourth Embodiment

FIG. 9 is a flowchart performed by the controller 62 according to the fourth embodiment. This flowchart is performed between the determination of "Yes" at Step 13 and Step S18 in FIG. 3.

The controller 62 sets a threshold of liquid water stored in the gas-liquid separator 57, which is a trigger for an order for the exhaust and drain valve 58 to open the valve, to the second liquid water amount (Step S120). The second liquid water amount is an amount smaller than the first liquid water amount that is a trigger in the normal discharge processing. The second liquid water amount is preferably equal to or smaller than 20% of the first liquid water amount, and more preferably equal to or smaller than 10% of the first liquid water amount.

Next, the controller 62 determines whether the amount of liquid water stored in the gas-liquid separator 57 is equal to or larger than the second liquid water amount (Step S130). When the determination at Step S130 is "No", Step S130 is performed again. Meanwhile, when the determination at Step S130 is "Yes", the controller 62 orders the exhaust and drain valve 58 to open the valve to perform discharge processing (Step S140). Step S140 is performed continuously until the amount of liquid water stored in the gas-liquid separator 57 becomes equal to or smaller than a predetermine threshold. While the exhaust and drain valve 58 is ordered to open the valve at Step S140, the controller 62 performs Step S18.

FIG. 10 is a timing chart of the flow chart illustrated in FIG. 9. When the liquid water amount stored in the gas-liquid separator 57, which is estimated on the basis of a power generation amount of the fuel cell 15, reaches the second liquid water amount (time t10, t14, t18), the controller 62 orders the exhaust and drain valve 58 to open the valve (Step S140 of FIG. 9). Assuming that the opening rate of the exhaust and drain valve 58 is 100%, when liquid water is discharged from the exhaust and drain valve 58 and the stored liquid water amount becomes equal to or smaller than a given value (e.g., zero) (time t12, t16), the controller 62 orders the exhaust and drain valve 58 to close the valve. Moreover, recovery presence-absence determination is performed while the exhaust and drain valve 58 is ordered to open the valve. Thus, the pretreatment of the above-described second embodiment may be performed then. FIG. 10 also illustrates timing of the first pretreatment for increasing a supply pressure of anode gas by shortening valve opening intervals of the injector 54 as compared with when the normal discharge processing is being performed, and timing of the fourth pretreatment for increasing a flow rate of cathode gas flowing in the cathode gas discharge path 308 by increasing the rotation speed of the compressor 33 as compared with when the normal discharge processing is being performed.

The above-described fourth embodiment exerts the following effects in addition to the same effects as the above-described first embodiment. That is, a threshold as a trigger for ordering the exhaust and drain valve 58 to open the valve to perform discharge processing is set to the second liquid water amount smaller than the first liquid water amount, which increases the frequency of orders for the exhaust and drain valve 58 to open the valve, and thus increases the number of times of recovery presence-absence determination performed.

E. Other Embodiments

E-1. Another Embodiment 1

In the above-described third embodiment, the controller 62 sets the present second threshold Lp3 so as to show a higher exhaust flow rate of anode offgas than the last threshold Lp2. However, the embodiment is not limited thereto. The present second threshold Lp3 may be set using the past second thresholds set for thawing presence-absence determination performed in the past below-freezing point start processing. For example, if the thawing determination is made with high frequency in thawing presence-absence determination performed in the below-freezing point start processing, the present second threshold Lp3 may be set to be lower than the past second thresholds. That is, depending on the manner of driving of the fuel cell vehicle 12 by a driver, the amount of liquid water generated in the fuel 15 varies. Therefore, the controller 62 learns the past second thresholds, for example, and sets the present second threshold. In this manner, it is possible to appropriately set the second threshold in accordance with driving characteristics of the driver, and thus reduce the frequency of freezing determination.

E-2. Another Embodiment 2

In the above-described embodiments, the controller 62 obtains an exhaust flow rate of anode offgas from the exhaust and drain valve 58 by calculation using a measurement value of the pressure sensor 59. However, the exhaust flow rate may be obtained by other methods. For example, a flowmeter may be arranged in the vicinity of an outlet of the exhaust and drain valve 58 in the exhaust and drain path 504, so that the controller 62 obtains a measurement value from the flowmeter as an exhaust flow rate.

Note that the present disclosure is not limited to the above-described embodiments, and includes various modifications. For example, the above-described embodiments are described in detail to facilitate understanding of the present disclosure, and the embodiment does not necessarily include all of the configurations described above. Moreover, a part of the configuration of an embodiment may be replaced by the configuration of another variant. In addition, it is also possible to add the configuration of another variant to the configuration of an embodiment. Moreover, regarding a part of the configuration of each embodiment, addition of another configuration, deletion, or replacement is possible. In addition, another configuration may be added. It is also possible to combine the embodiments, variants, and modifications. The present disclosure may be implemented by aspects described below.

(1) One aspect of the present disclosure provides a fuel cell system. The fuel cell system includes a fuel cell, a temperature sensor that measures an environmental temperature of the fuel cell, an anode gas supply system that supplies anode gas to the fuel cell and includes an anode gas supply path in which anode gas toward the fuel cell flows, an anode gas circulation system that lets anode offgas discharged from the fuel cell circulate to the anode gas supply path and includes an anode gas circulation path in which the anode offgas toward the anode gas supply path flows, an exhaust and drain path that connects the anode gas circulation path to an outside, an exhaust and drain valve that opens and closes the exhaust and drain path, and a controller that controls actions of the fuel cell system, in which the controller includes a freezing presence-absence determination unit that performs freezing presence-absence determination of whether the exhaust and drain valve is frozen using an exhaust flow rate of gas discharged from the exhaust and drain valve, when the fuel cell system is started and if a measurement value of the temperature sensor is below freezing point and the exhaust and drain valve is ordered to open the valve, a temperature raising execution unit that performs temperature raising processing for raising a temperature of the exhaust and drain valve when the freezing presence-absence determination unit has made freezing determination indicating that the exhaust and drain valve is frozen, and a thawing presence-absence determination unit that performs thawing presence-absence determination of whether the exhaust and drain valve is thawed using an exhaust flow rate of the anode offgas when the exhaust and drain valve is ordered to open the valve at least either during the temperature raising processing or after the temperature raising processing, in the freezing presence-absence determination, the freezing determination is made when the exhaust flow rate of the anode offgas is equal to or lower than a first threshold, in the thawing presence-absence determination, thawing determination indicating that the exhaust and drain valve is thawed is made when the exhaust flow rate of the anode offgas is higher than a second threshold, and the second threshold shows a flow rate higher than the first threshold. In this aspect, the second threshold used for thawing presence-absence determination shows a higher flow rate than the first threshold used for freezing presence-absence determination. Thus, it is possible to reduce the possibility that the freezing determination is made when the fuel cell system is stopped after thawing determination and the freezing presence-absence determination is performed at the next start of the fuel cell system. Therefore, it is possible to reduce the number of times of temperature raising processing performed.

(2) The above-described aspect further includes a pressure sensor that measures a pressure in the anode gas supply path, in which the controller may calculate an exhaust flow rate of the anode gas using variation of a pressure measured by the pressure sensor, and the controller may perform, for the thawing presence-absence determination, at least one of a first pretreatment for increasing a pressure of the anode gas supplied to the fuel cell, as compared with a case of normal discharge processing for discharging the anode offgas from the exhaust and drain valve that is performed in normal operation of the fuel cell system, a second pretreatment for lowering a flow rate of the anode offgas circulating from the anode gas circulation path to the anode gas supply path, as compared with a case of the normal discharge processing, and a third pretreatment for lowering a current value of the fuel cell, as compared with a case of the normal discharge processing. In this aspect, at least one of the processing of the first pretreatment to the third pretreatment is performed, whereby it is possible to reduce the possibility that a pressure measured by the pressure sensor is varied due to elements other than gas discharged from the exhaust and drain valve. Therefore, it is possible to further improve the calculation accuracy of the exhaust flow rate and thus perform recovery presence-absence determination more accurately.

(3) In the above-described aspect, the controller may set a present second threshold that is the second threshold used for present thawing presence-absence determination, using past second thresholds that are the second thresholds used for past thawing presence-absence determination. In this aspect, the present second threshold is set using the past second thresholds, which makes it possible to set the second threshold appropriately.

(4) In the above-described aspects, the controller may set the present second threshold so as to show the exhaust flow rate higher than a last second threshold that is the second threshold used for last thawing presence-absence determination among the past second thresholds. In this aspect, it is possible to further reduce the possibility that the freezing determination is made when the fuel cell system is stopped after thawing determination and the freezing presence-absence determination is performed at the next start of the fuel cell system.

(5) In the above-described aspect, the temperature raising execution unit may perform the temperature raising processing by warm-up operation. In this aspect, the temperature raising processing is performed by warm-up operation, which makes another device such as a heater unnecessary for temperature raising processing.

The present disclosure may be achieved by various aspects other than the above, and may be achieved by aspects such as a method of controlling a fuel cell system, a program for performing a control method, and a vehicle with a fuel cell system, for example.

What is claimed is:

1. A fuel cell system, comprising:
a fuel cell;
a temperature sensor that measures an environmental temperature of the fuel cell;
an anode gas supply system that supplies anode gas to the fuel cell and includes an anode gas supply path in which anode gas toward the fuel cell flows;
a cathode gas supply system that supplies cathode gas to the fuel cell, the cathode gas supply system having a cathode gas supply path and a compressor disposed in the cathode gas supply path;
a cathode gas discharge system having a cathode gas discharge path to discharge cathode gas discharged from the fuel cell to an outside;
a pressure sensor that measures a pressure in the anode gas supply path;
an anode gas circulation system that lets anode offgas discharged from the fuel cell circulate to the anode gas supply path and includes an anode gas circulation path in which the anode offgas toward the anode gas supply path flows;
an exhaust and drain path that connects the anode gas circulation path to the cathode gas discharge path;
an exhaust and drain valve that opens and closes the exhaust and drain path; and
a controller that controls actions of the fuel cell system, wherein the controller includes
a freezing presence-absence determination unit that performs freezing presence-absence determination of whether the exhaust and drain valve is frozen using an exhaust flow rate of the anode offgas discharged from the exhaust and drain valve, when the fuel cell system is started and if a measurement value of the temperature sensor is below freezing point and the exhaust and drain valve is ordered to open the valve,
a temperature raising execution unit that performs temperature raising processing for raising a temperature of the exhaust and drain valve when the freezing presence-absence determination unit has made freezing determination indicating that the exhaust and drain valve is frozen, and
a thawing presence-absence determination unit that performs thawing presence-absence determination of whether the exhaust and drain valve is thawed using the exhaust flow rate of the anode offgas when the exhaust and drain valve is ordered to open the valve at least either during the temperature raising processing or after the temperature raising processing,
in the freezing presence-absence determination, the freezing determination is made when the exhaust flow rate of the anode offgas is equal to or lower than a first threshold,
in the thawing presence-absence determination, thawing determination indicating that the exhaust and drain valve is thawed is made when the exhaust flow rate of the anode offgas is higher than a second threshold, and
the second threshold shows a flow rate higher than the first threshold, wherein
the controller calculates an exhaust flow rate of the anode gas using variation of a pressure measured by the pressure sensor, and
the controller performs, for the thawing presence-absence determination, at least one of
a first pretreatment for increasing a pressure of the anode gas supplied to the fuel cell, as compared with a case of normal discharge processing for discharging the anode offgas from the exhaust and drain valve that is performed in normal operation of the fuel cell system, wherein while performing the first pretreatment, the controller performs a fourth pretreatment to increase a flow rate of the cathode gas flowing in the cathode gas discharge path by increasing a compressor speed such that the compressor speed becomes greater than a compressor speed used during the normal discharge processing,
a second pretreatment for lowering a flow rate of the anode offgas circulating from the anode gas circulation path to the anode gas supply path, as compared with a case of the normal discharge processing, and
a third pretreatment for lowering a current value of the fuel cell, as compared with a case of the normal discharge processing.

2. The fuel cell system according to claim 1, wherein the controller sets a present second threshold that is the second threshold used for present thawing presence-absence determination, using past second thresholds that are the second thresholds used for past thawing presence-absence determination.

3. The fuel cell system according to claim 2, wherein the controller sets the present second threshold so as to show the exhaust flow rate higher than a last second threshold that is the second threshold used for last thawing presence-absence determination among the past second thresholds.

4. The fuel cell system according to claim 1, wherein the temperature raising execution unit performs the temperature raising processing by warm-up operation.

5. The fuel cell system according to claim 1, wherein
the anode gas supply system further comprises an injector for adjusting an anode gas supply amount to the fuel cell, and the controller, during the first pretreatment, increases an anode gas supply pressure by shortening a valve opening interval of the injector as compared to a valve opening interval used during the normal discharge processing.

\* \* \* \* \*